(12) United States Patent
Schwartz et al.

(10) Patent No.: US 9,376,216 B2
(45) Date of Patent: Jun. 28, 2016

(54) VISUAL FUEL PREDICTOR SYSTEM

(71) Applicant: The Boeing Company, Chicago, IL (US)

(72) Inventors: Samantha A. Schwartz, Castle Pines, CO (US); Andreas Godehart, Dreieichenhain (DE); Nils Kneuper, Bergkamen (DE); Andre Lutz, Erzhausen (DE); Mariusz Nawotczynski, Gdansk (PL)

(73) Assignee: THE BOEING COMPANY, Chicago, IL (US)

( * ) Notice: Subject to any disclaimer, the term of this patent is extended or adjusted under 35 U.S.C. 154(b) by 144 days.

(21) Appl. No.: 14/291,279

(22) Filed: May 30, 2014

(65) Prior Publication Data
US 2015/0344148 A1 Dec. 3, 2015

(51) Int. Cl.
G06F 19/00 (2011.01)
G06G 7/70 (2006.01)
G06G 7/76 (2006.01)
B64D 45/00 (2006.01)
B64D 37/00 (2006.01)
B64D 43/00 (2006.01)
G05D 1/00 (2006.01)

(52) U.S. Cl.
CPC .............. *B64D 45/00* (2013.01); *B64D 37/005* (2013.01); *B64D 43/00* (2013.01); *G05D 1/00* (2013.01); *B64D 2045/0075* (2013.01)

(58) Field of Classification Search
CPC ......... B64D 5/00; B64D 37/005; B64D 43/00
USPC ....................................................... 701/123
See application file for complete search history.

(56) References Cited

U.S. PATENT DOCUMENTS

| | | | |
|---|---|---|---|
| 2,697,348 A | 12/1954 | Bevins et al. | |
| 3,361,897 A | 1/1968 | Rush et al. | |
| 5,708,424 A | 1/1998 | Orlando et al. | |
| 2011/0208376 A1* | 8/2011 | Mere | G01C 21/20 701/14 |

* cited by examiner

*Primary Examiner* — Maceeh Anwari
(74) *Attorney, Agent, or Firm* — Yee & Associates, P.C.

(57) ABSTRACT

A method and apparatus for predicting fuel for an aircraft. Remaining amounts of fuel that will be present for types of fuel use for the aircraft at a destination are predicted. Flight times for the types of fuel use are calculated from the remaining amounts of fuel predicted for the types of fuel use for the aircraft at the destination. Graphical indicators are displayed indicating the types of fuel use and the flight times for the types of fuel use.

20 Claims, 7 Drawing Sheets

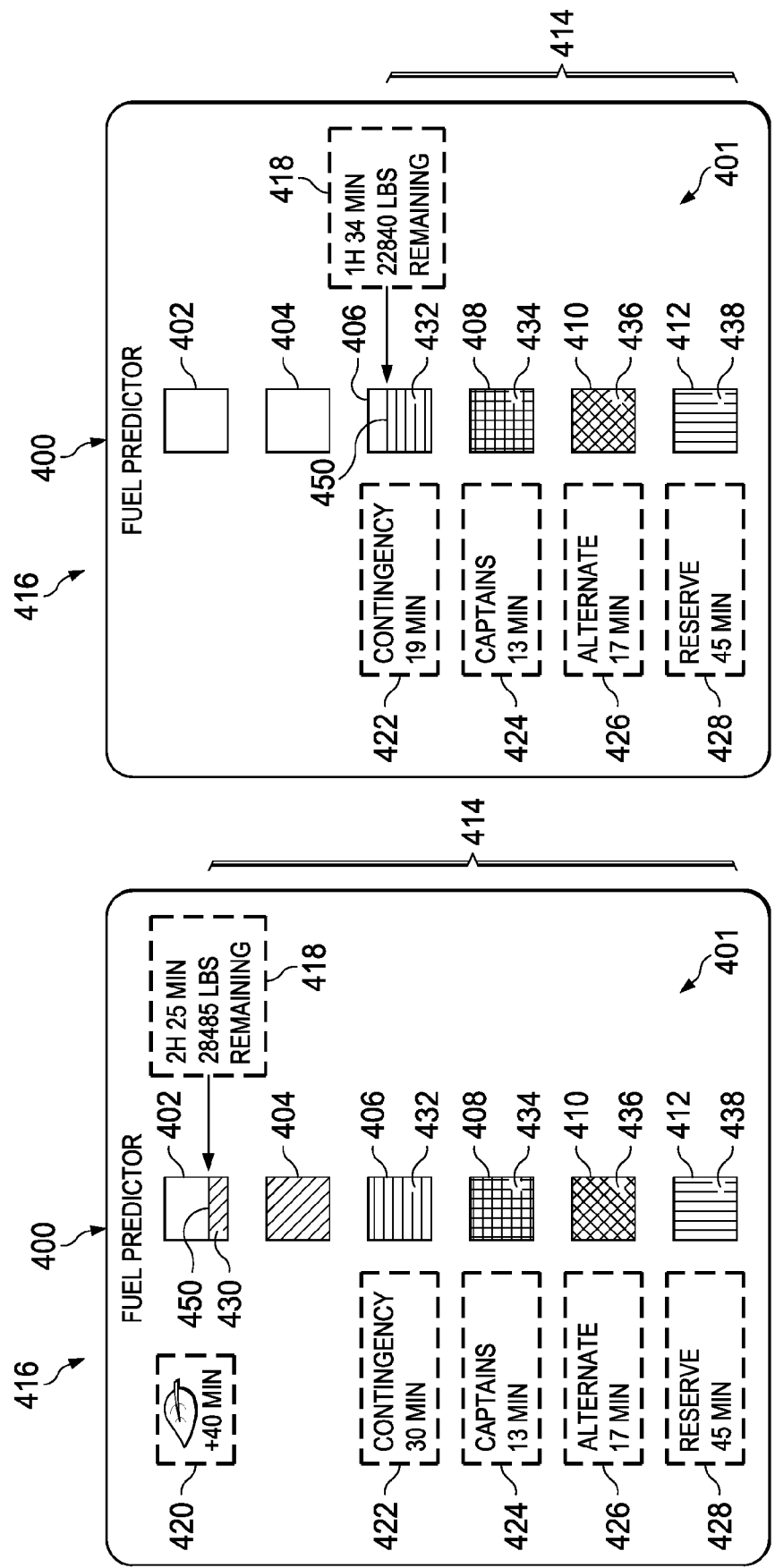

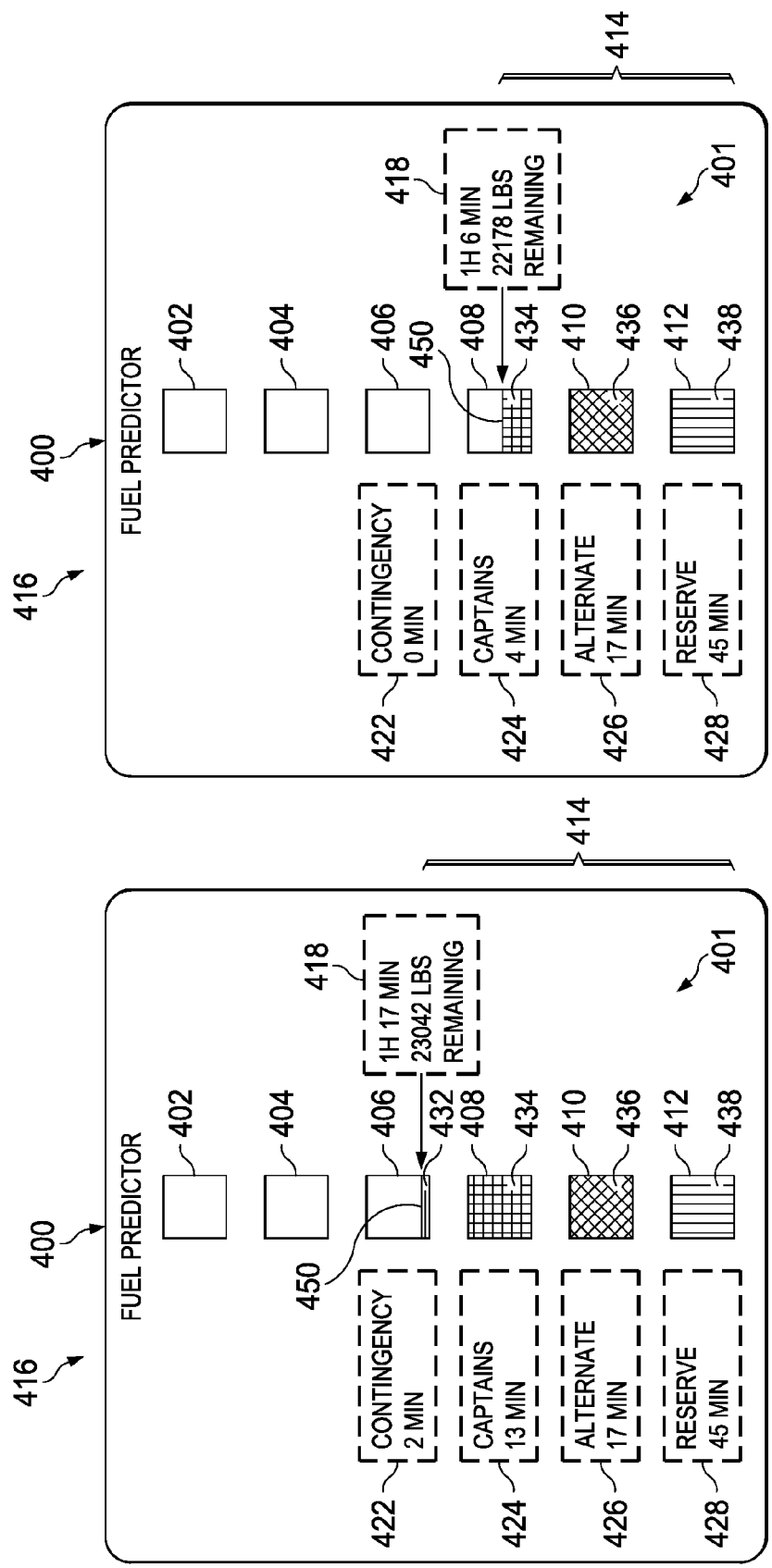

– 1 –

VISUAL FUEL PREDICTOR SYSTEM

BACKGROUND INFORMATION

1. Field

The present disclosure relates generally to aircraft and, in particular, to fuel use in an aircraft. Still more particularly, the present disclosure relates to a method and apparatus for predicting fuel for an aircraft.

2. Background

In operating an aircraft, an operator, such as a pilot or a dispatcher, creates a flight plan, monitors the use of fuel for a flight of an aircraft, or both creates a flight plan and monitors fuel use. For example, when creating a flight plan, the operator, such as a dispatcher, identifies the amount of fuel needed for the flight. The amount of fuel needed by an aircraft also takes into account different rules and regulations that specify how much fuel should be available for different situations in addition to the fuel needed to reach the destination.

For example, the operator may identify the amount of fuel needed to reach the destination, the fuel needed if placed in a holding pattern, the fuel needed if the aircraft is sent to an alternate destination in the flight plan, and captain's fuel as the reserve. The identifications are for types of fuel use for the aircraft.

The amount of fuel planned for use by an aircraft may be adjusted or selected by the pilot prior to takeoff. For example, when the aircraft is at the gate and being refueled, the pilot may review the flight plan and make changes to the amount of fuel for the aircraft based on various factors. These factors may include weather conditions, efficiency of the current aircraft, reaching the destination at a particular time, and other suitable factors.

The fuel present in the aircraft is indicated through a display system. The display system displays the amount of fuel present in the fuel tanks. This display currently shows the amount of fuel with units in the form of the weight of the fuel. If the pilot is uncomfortable with the amount of fuel present or planned for the flight, the pilot may order additional fuel to be placed into the fuel tanks.

To determine whether additional fuel may be needed, the operator performs calculations as to whether the fuel present or planned is sufficient to reach the destination and meet other rules and regulations regarding the amount of fuel that should be present for the flight to cover different contingencies. These types of calculations are time-consuming and involve concentration by the operator.

For example, these types of operations may be performed in the aircraft by a pilot prior to flight in addition to other operations for preflight checks and planning. With the number of different operations to perform prior to take off, the pilot may err on the side of caution and add more fuel than may be needed to meet a desired safety factor.

Additional fuel increases the weight of the aircraft. As the weight of the aircraft increases, the fuel consumption of the aircraft increases. As a result, the increased fuel use may increase the cost of the flight more than desired. Therefore, it would be desirable to have a method and apparatus that take into account at least some of the issues discussed above, as well as other possible issues.

SUMMARY

In one illustrative embodiment, a method for predicting fuel for an aircraft is provided. Remaining amounts of fuel that will be present for types of fuel use for the aircraft at a destination are predicted. Flight times for the types of fuel use are calculated from the remaining amounts of fuel predicted for the types of fuel use for the aircraft at the destination. Graphical indicators are displayed indicating the types of fuel use and the flight times for the types of fuel use.

In another illustrative embodiment, an apparatus comprises a display system and a fuel predictor. The fuel predictor is configured to predict remaining amounts of fuel that will be present for types of fuel use for an aircraft at a destination. The fuel predictor is further configured to calculate flight times for the types of fuel use from the amounts of fuel predicted for the types of fuel use for the aircraft at the destination. The fuel predictor is still further configured to display graphical indicators indicating the types of fuel use and the flight times for the types of fuel use on the display system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of a graphical user interface displaying remaining amounts of fuel predicted for an aircraft in accordance with an illustrative embodiment;

FIG. 5 is an illustration of a graphical user interface displaying remaining amounts of fuel predicted for an aircraft in accordance with an illustrative embodiment;

FIG. 6 is another illustration of a graphical user interface displaying remaining amounts of fuel predicted for an aircraft in accordance with an illustrative embodiment;

FIG. 7 is yet another illustration of a graphical user interface displaying remaining amounts of fuel predicted for an aircraft in accordance with an illustrative embodiment;

DETAILED DESCRIPTION

The illustrative embodiments recognize and take into account different considerations. For example, the illustrative embodiments recognize and take into account that time and effort needed by a pilot to identify the fuel for a flight of an aircraft may be more than desired, especially when the pilot performs other preflight operations in the aircraft. The illustrative embodiments also recognize and take into account that the display of fuel does not differentiate amounts of fuel for different types of use. The illustrative embodiments also recognize and take into account that, as a result, the pilot may add more fuel than needed to an aircraft.

Thus, the illustrative embodiments provide a method and apparatus for predicting fuel for an aircraft. In one example, remaining amounts of fuel that will be present for types of fuel use for the aircraft at the current destination is predicted. The flight times are calculated for the types of fuel use from the amounts of fuel predicted for the types of fuel use for the aircraft at the current destination. Graphical indicators indicating the types of fuel use and the flight times for the types of fuel use are displayed.

In this manner, the pilot or other operator may be presented with the visualization of the fuel predicted to be present at the destination. In this example, the destination may be the currently planned destination or may be the location at the end of the flight. Further, the display of the types of fuel use also provides additional aid to an operator in the flight plan, during operation of the aircraft, or both. The operator may be, for example, the pilot, a dispatcher, or some other person. In one example, when the operator is a pilot, the pilot may be presented with the visualization of the fuel predicted to be available for each type of fuel use at the current destination.

This visualization provides the pilot with further aid by showing decision points during the operation of the aircraft In the illustrative examples, a decision point is a location, time, or both at which a pilot needs to make a decision as to whether to take an action or what action to take.

Figure 1:
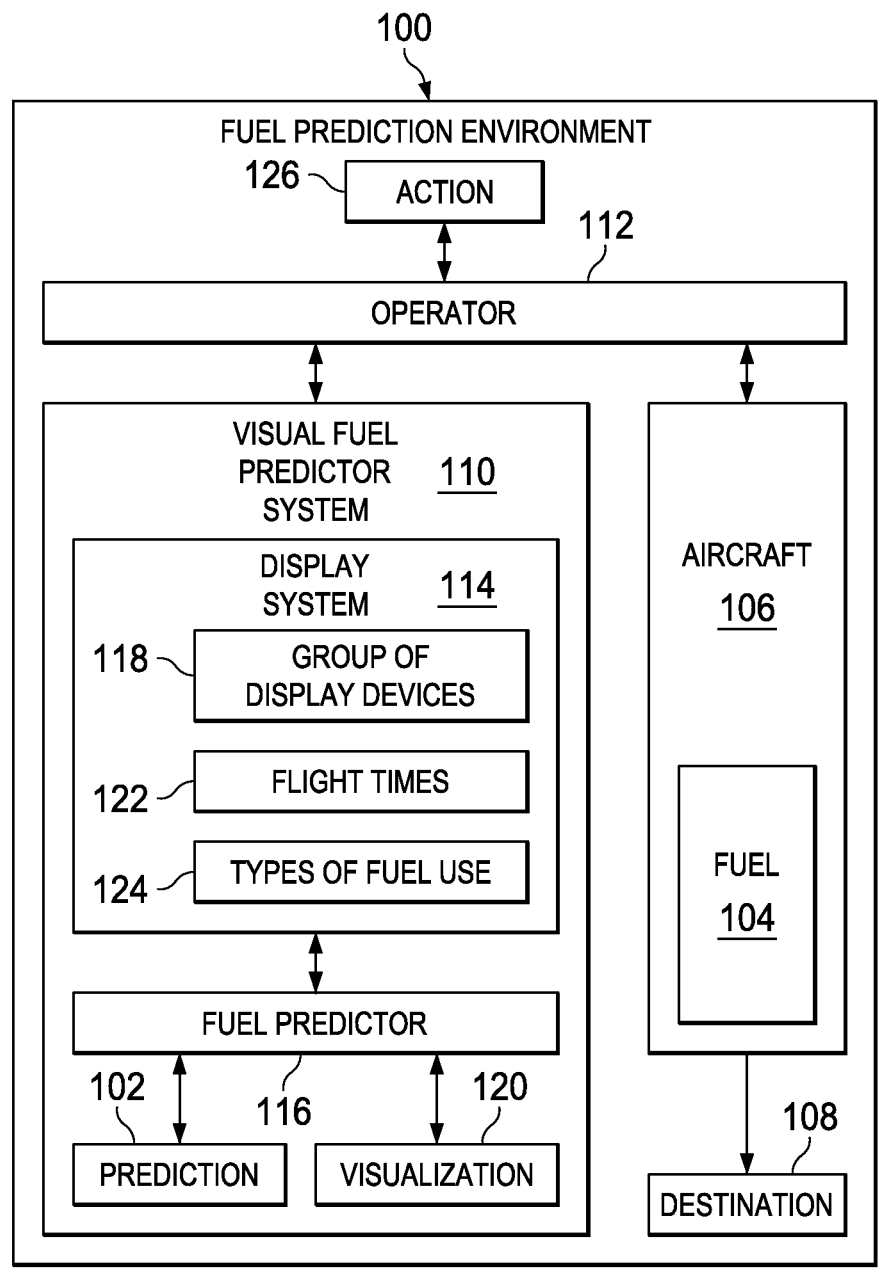
FIG. 1 is an illustration of a block diagram of a fuel prediction environment in accordance with an illustrative embodiment.

With reference now to the figures, and in particular with reference to FIG. 1, an illustration of a block diagram of a fuel prediction environment is depicted in accordance with an illustrative embodiment. In this example, fuel prediction environment 100 is an example of an environment in which prediction 102 of fuel 104 for aircraft 106 may be made. In these illustrative examples, prediction 102 may be for fuel 104 that remains for aircraft 106 when aircraft 106 reaches destination 108. In these illustrative examples, destination 108 may be any location that the aircraft may reach. For example, destination 108 may be an airport planned for landing. In other illustrative examples, destination 108 may be an alternate airport for other locations that may be used in the event that the originally planned airport cannot be reached.

In this illustrative example, aircraft 106 is a commercial aircraft. In other illustrative embodiments, aircraft 106 may take other forms. For example, aircraft 106 may be a fixed wing aircraft, a military aircraft, a rotorcraft, a helicopter, a zeppelin, an airship, a manned aircraft, an unmanned aerial vehicle, or other suitable type of aircraft.

As depicted, visual fuel predictor system 110 is configured to generate prediction 102 of fuel 104 in aircraft 106 when aircraft 106 reaches destination 108. Additionally, visual fuel predictor system 110 also may display prediction 102 to operator 112. Operator 112 may be located in aircraft 106 or operator 112 may be in a location remote to aircraft 106.

Visual fuel predictor system 110 has a number of different components. In this illustrative example, visual fuel predictor system 110 includes display system 114 and fuel predictor 116.

Display system 114 is a hardware system and may include software. In these illustrative examples, display system 114 is comprised of group of display devices 118. When used with reference to items, a "group of" is one or more items. For example, group of display devices 118 is one or more display devices.

In these illustrative examples, the display device in group of display devices 118 may take various forms. For example, the display device may be a multifunction display in aircraft 106, a touchscreen, a liquid crystal display, a cathode ray tube display, or some other suitable device.

In the illustrative examples, display system 114 is configured to display visualization 120 of prediction 102. In this illustrative example, visualization 120 of prediction 102 of fuel 104 remaining in aircraft 106 is displayed on one or more of group of display devices 118 in display system 114 in terms of flight times 122. Flight times 122 are displayed instead of other types of units such as weight or volume. Further, visualization 120, when displayed in display system 114, also may include an indication of types of fuel use 124 for fuel 104 in aircraft 106.

With visualization 120, operator 112 may more easily perform action 126. As depicted, action 126 may take various forms. For example, action 126 may be selected from one of ordering additional fuel, selecting an alternative destination, completing a checklist, and other suitable types of actions.

In this illustrative example, fuel predictor 116 is configured to generate prediction 102. Additionally, fuel predictor 116 is also configured to generate visualization 120 of prediction 102 for display on display system 114. In this manner, operator 112 may identify and take action 126 based on visualization 120 of prediction 102 of fuel 104 remaining when aircraft 106 reaches destination 108.

In these illustrative examples, visualization 120 may be used by operator 112 in planning for a flight of aircraft 106. In other words, operator 112 may generate or modify a flight plan using visualization 120 of prediction 102.

In other illustrative examples, operator 112 may be a pilot operating an aircraft that uses visualization 120 of prediction 102 prior to flight of aircraft 106. In yet other illustrative examples, the pilot may make decisions and perform action 126 during flight of aircraft 106 using visualization 120 of prediction 102 of fuel 104 for aircraft 106.

Figure 2:
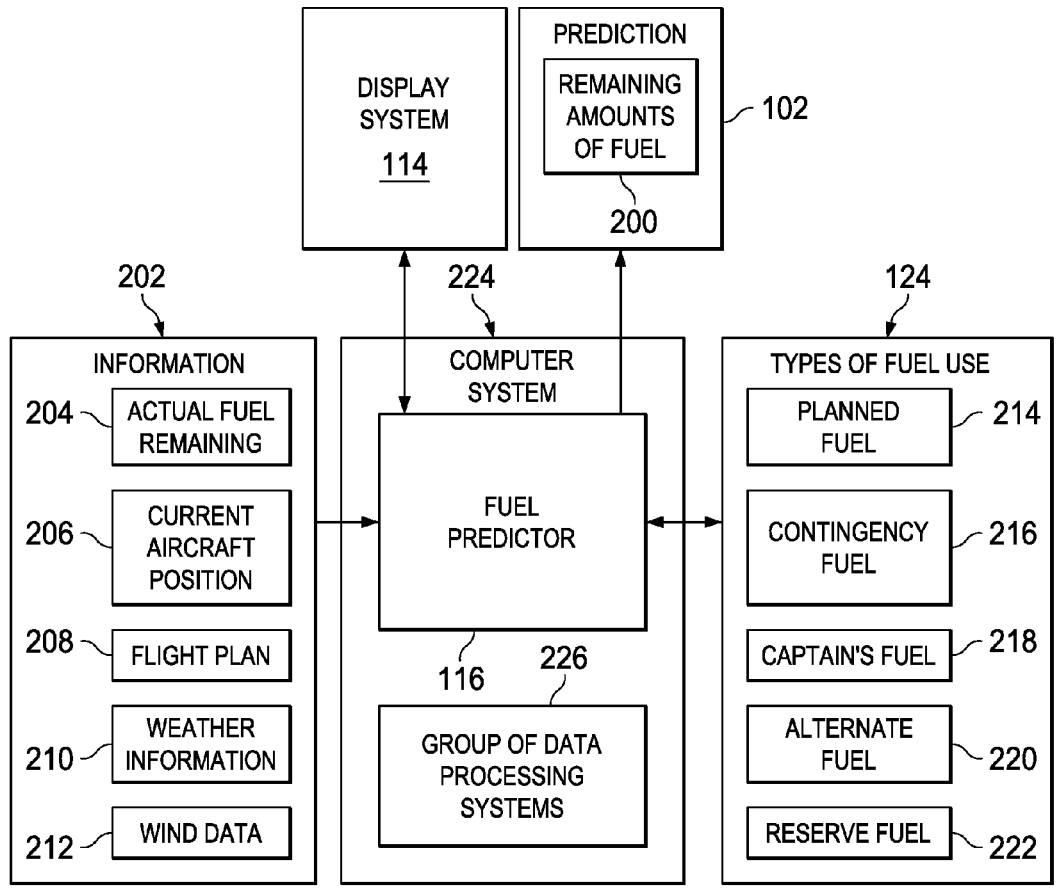
FIG. 2 is an illustration of a block diagram of a visual fuel predictor system generating a visualization of a prediction of fuel for an aircraft in accordance with an illustrative embodiment.

Turning now to FIG. 2, an illustration of a block diagram of a visual fuel predictor system generating a visualization of a prediction of fuel for an aircraft is depicted in accordance with an illustrative embodiment. In this example, an illustration of data flow used to generate prediction 102 for fuel 104 remaining for aircraft 106 when aircraft 106 reaches destination 108 from FIG. 1 is shown.

In this illustrative example, in generating prediction 102 for fuel 104 for aircraft 106, fuel predictor 116 is configured to predict remaining amounts of fuel 200 that will be present for types of fuel use 124 for aircraft 106 at destination 108. In other words, prediction 102 includes remaining amounts of fuel 200 predicted for aircraft 106 when aircraft 106 reaches destination 108. Typically, remaining amounts of fuel 200 predicted for aircraft 106 are in units of measurement such as weight or volume.

As depicted, fuel predictor 116 predicts remaining amounts of fuel 200 based on information 202. Information 202 may take various forms and may be received from different sources. In these illustrative examples, information 202 includes at least one of actual fuel remaining 204, current aircraft position 206, flight plan 208, weather information 210, wind data 212, or other suitable types of information that may be useful in generating prediction 102 of fuel 104, such as remaining amounts of fuel 200 at destination 108 for aircraft 106.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present.

As depicted, actual fuel remaining 204 is fuel 104 present in aircraft 106 at a particular time. This time is current time when operator 112 is operating aircraft 106. In other illustrative examples, the particular time may be a particular time in a flight plan when operator 112 is generating a flight plan for aircraft 106.

In an illustrative example, current aircraft position 206 may be the current position of aircraft 106 during flight of aircraft 106. When generating a flight plan, current aircraft position 206 may mean the position of aircraft 106 along a planned route or a potential route for the flight plan. In other words, current aircraft position 206 may be a position selected by operator 112 for planning purposes.

Flight plan 208 is the information about a flight for aircraft 106 in this illustrative example. Flight plan 208 includes different types of information. For example, flight plan 208 may include at least one of waypoints, altitudes, wind, reserve fuel, alternate fuel, extra fuel, contingency fuel, plan fuel remaining, fuel burn, alternate destination points, or other suitable types of information. Some of this information is always found in flight plan 208.

In this illustrative example, weather information 210 may include information about current weather conditions, predicted weather conditions, or some combination thereof. Wind data 212 includes information about winds that may be encountered by aircraft 106. Wind data 212 may include current winds as well as predicted winds.

In these illustrative examples, prediction 102 for remaining amounts of fuel 200 for aircraft 106 may be performed using currently available prediction processes. These processes may be found in currently available flight planning tools and software used in aircraft 106. Examples of flight planning tools include, for example, Jeppesen Internet Flight Planner (JIFP) or Jetplan.com, which is available from Jeppesen.

In this illustrative example, fuel predictor 116 identifies types of fuel use 124 for aircraft 106. In these illustrative examples, types of fuel use 124 may include at least one of planned fuel 214, contingency fuel 216, captain's fuel 218, alternate fuel 220, reserve fuel 222, or other types of fuel use 124.

In one illustrative example, planned fuel 214 is a portion of fuel 104 that is selected for use in flying aircraft 106 along a planned route to destination 108. In particular, planned fuel 214 is intended to be used during flight execution in this illustrative example. Contingency fuel 216 is fuel 104 that is present in aircraft 106 for use in case of unforeseen events. Contingency fuel 216 is a portion of fuel 104 which has a minimum amount that is set by regulations.

As depicted, captain's fuel 218 is a portion of fuel 104 that may be designated by operator 112 as extra amounts of fuel 104. Captain's fuel 218 may be additional amounts of fuel 104 when operator 112 is uncomfortable with the amount of fuel 104 planned or present for aircraft 106. Captain's fuel 218 may also be referred to as extra fuel.

In this illustrative example, alternate fuel 220 is a portion of fuel 104 that is present in aircraft 106 to reach an alternate destination in place of destination 108. For example, weather conditions at destination 108 or other factors may result in aircraft 106 being diverted from destination 108 to an alternate destination. Alternate fuel 220 is a portion of fuel 104 needed to reach the alternate destination.

Reserve fuel 222 is a portion of fuel 104 that is present in case of unplanned events. Reserve fuel 222 may be used for events that may arise during normal flight but are not considered in selecting planned fuel 214 or in contingency fuel 216.

From types of fuel use 124 identified for aircraft 106, fuel predictor 116 divides remaining amounts of fuel 104 in prediction 102 into types of fuel use 124. Thereafter, fuel predictor 116 is configured to calculate flight times 122 shown in FIG. 1 for types of fuel use 124 from remaining amounts of fuel 200 predicted for types of fuel use 124 for aircraft 106 at destination 108. As depicted, flight times 122 are for aircraft 106 traveling to destination 108. In other words, destination 108 is the current destination for aircraft 106. In other illustrative examples, flight times 122 may be times from a particular location in a flight plan, such as flight plan 208.

Fuel predictor 116 is also configured to display visualization 120 in a manner that indicates types of fuel use 124 for aircraft 106 and flight times 122 for types of fuel use 124 as predicted by fuel predictor 116 on display system 114. In these illustrative examples, visualization 120 of prediction 102 is presented to operator 112 through group of display devices 118 shown in FIG. 1 in display system 114.

In these illustrative examples, visualization 120 of remaining amounts of fuel 200 predicted for aircraft 106 may be used by operator 112 to make decisions and form action 126 in FIG. 1 with less time and effort as compared to currently used systems for displaying fuel 104. Further, operator 112 may plan for less amounts of fuel 104 to reach destination 108 through visualization 120. The initial plan made by operator 112 and the initially planned use of fuel 104 is all used during flight of aircraft 106. In other words, fuel 104 planned by operator 112 may be fuel 104 after an initial plan for fuel 104 is made for a flight plan. In this manner, costs for a flight of aircraft 106 may be reduced. For example, the reduction in cost may be reduced fuel costs for operating aircraft 106.

As depicted, fuel predictor 116 may be implemented in software, hardware, firmware or a combination thereof. When software is used, the operations performed by fuel predictor 116 may be implemented in program code configured to run on a processor unit. When firmware is used, the operations performed by fuel predictor 116 may be implemented in program code and data and stored in persistent memory to run on a processor unit. When hardware is employed, the hardware may include circuits that operate to perform the operations in fuel predictor 116.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this illustrative example, fuel predictor 116 may be implemented as or in computer system 224. Computer system 224 is comprised of group of data processing systems 226. When more than one data processing system is present in group of data processing systems 226, the data processing systems in computer system 224 may communicate with each other through a communications medium, such as a network. The network may include wired links, wireless links, or both.

Portions or all of computer system 224 may be located on aircraft 106. In some examples, computer system 224 may be distributed to other locations, such as an airline center, an aircraft manufacturer, or other suitable locations.

In this illustrative example, fuel predictor 116 implemented in a data processing system in group of data processing systems 226 may be located in one of a flight management system in aircraft 106, an electronic flight bag (EFB), a tablet computer, a laptop computer, a mobile phone, a wearable computer with an optical head-mounted display (OHMD), a desktop computer, or some other suitable data processing system. In other words, group of data processing systems 226 may be comprised of different types of data processing systems.

Figure 3:
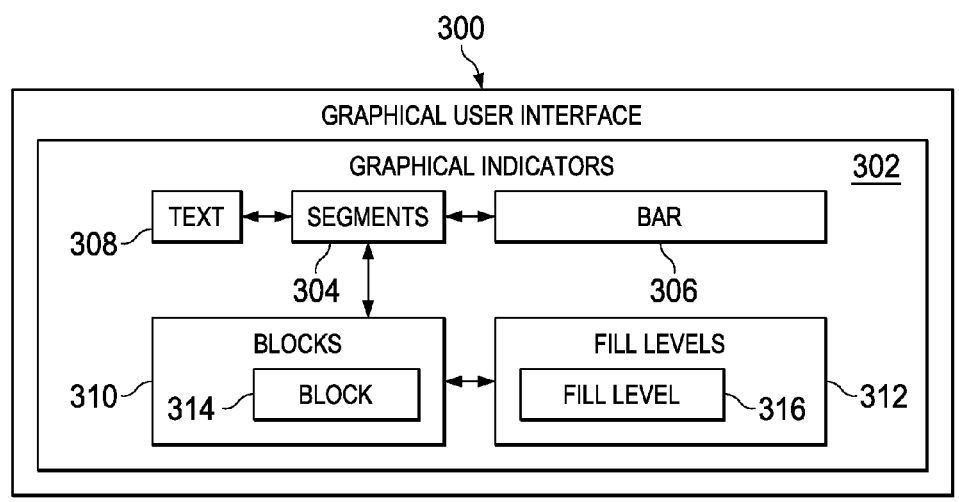
FIG. 3 is an illustration of a block diagram of a display of the prediction of remaining amounts of fuel in accordance with an illustrative embodiment.

Reference now to FIG. 3, an illustration of a block diagram of a display of the prediction of remaining amounts of fuel is depicted in accordance with an illustrative embodiment. In this depicted example, graphical user interface 300 is an example of an interface that may be displayed within display system 114 to provide visualization 120 of prediction 102 about fuel 104 as shown in FIG. 1.

As depicted, graphical user interface 300 includes graphical indicators 302. Fuel predictor 116 is configured to display graphical indicators 302 indicating types of fuel use 124 and flight times 122 for types of fuel use 124 in graphical user interface 300 on display system 114 as shown in FIG. 1.

In this illustrative example, the display of graphical indicators 302 may take the form of segments 304 indicating remaining amounts of fuel 200 predicted for aircraft 106. As depicted, fuel predictor 116 is configured to display segments 304 in graphical user interface 300 on display system 114 that indicate a predicted fuel level. Segments 304 correspond to types of fuel use 124 and flight times 122 for types of fuel use 124. In this manner, segments 304 may graphically indicate remaining amounts of fuel 200.

In this illustrative example, segments 304 correspond to types of fuel use 124 and indicate flight times 122 for type of fuel use 124. In other words, each segment in segments 304 represents a particular type of fuel use within types of fuel use 124 for aircraft 106. In one illustrative example, segments 304 are displayed as bar 306.

The indication of remaining amounts of fuel 200 may be performed in a number of different ways. For example, segments 304 may be graphically shown as blocks 310. Each of blocks 310 may indicate remaining amounts of fuel 200 that may be present or planned for different types of fuel use 124. Blocks 310 may have fill levels 312. Fill levels 312 indicate remaining amounts of fuel 200 predicted to be present for the respective ones of blocks 310.

For example, block 314 in blocks 310 may have fill level 316 in fill levels 312. Fill level 316 indicates remaining amount of fuel 200 left for a particular type of fuel use represented by block 314.

As depicted, each of segments 304 has a fill level relative to fill levels 312 for other segments in segments 304 to indicate relative amounts of fuel 104 remaining for each of types of fuel use 124. In this manner, the relative remaining amounts of fuel 200 planned for types of fuel use 124 and the remaining amounts of fuel 200 predicted for types of fuel use 124 may be graphically indicated.

In this manner, fill level 316 of segments 304 indicates the amount of fuel for a particular one of types of fuel use 124 as compared to other ones of types of fuel use 124. The fill level may be in terms of length, width, area, or some other aspect that indicates the size of segments 304. Each of the segments may have a fill level relative to other segments to indicate relative amounts of the fuel remaining for each of the types of fuel use.

In addition, graphical indicators 302 also may include text 308. In this illustrative example, fuel predictor 116 is further configured to display text 308 identifying types of fuel use 124 and flight times 122 for types of fuel use 124 in graphical user interface 300.

Text 308 may be displayed in association with segments 304. For example, text 308 may be displayed in locations relative to segments 304 to present information about segments 304. In other illustrative examples, text 308 is displayed with other ones of graphical indicators 302 shown in association with segments 304. For example, an arrow, graphic, or some other type of graphical indicator may be used to show that a particular portion of text 308 is providing information about a particular segment in segments 304.

In these illustrative examples, text 308 may present information such as, for example, identifying types of fuel use 124 and flight times 122 for types of fuel use 124. Of course, text 308 also may be displayed to provide other types of information to operator 112. Other types of information may include, for example, actual fuel remaining 204 in FIG. 2 or other suitable types of information.

In the illustrative example, segments 304 may be used to present the pilot or other operator with visualization 120 of decision points. As depicted, visualization 120 provides the pilot with further aid by showing decision points during the operation of aircraft 106. The decision points are when the type of fuel use in types of fuel use 123 is to be used based on a prediction by fuel predictor 116. The type of fuel use may be a type other than planned fuel 214.

For example, when alternate fuel 220 is predicted to be used, a determination is made as to whether to change destination 108 to an alternate airport. As another example, when reserve fuel 220 is predicted to be used, a determination is made as to whether an emergency is to be declared.

The illustration of fuel prediction environment 100 and the different components in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, visualization 120 of prediction 102 may be configured such that visualization 120 may be presented on different types of data processing systems within group of data processing systems 226. This visualization 120 may be such that the display is the same or substantially the same on different types of data processing systems in group of data processing systems 226.

As another example, in some illustrative examples, remaining amounts of fuel 200 predicted for aircraft 106 may be converted into flight times 122 and then divide flight times 122 into types of fuel use 124. As another example, segments 304 in FIG. 3 may be arranged to have a form other than bar 306. For example, segments 304 may be arranged to form an arc, a circle, or some other suitable configuration.

In still other illustrative examples, graphical indicators 302 may include other types of graphs in addition to or in place of segments 304 and text 308. For example, animation, color, bolding, flashing, font size, lines, and other types of suitable graphical indicators may be used in graphical indicators 302.

As another illustrative example, segments 304 may be graphically indicated in other forms other than using blocks 310. For example, segments 304 may be comprised of lines. Fill levels 312 may be indicated using color, line thickness, or other graphical indicators.

Turning next to FIGS. 4-7, an illustration of a graphical user interface displaying visualizations of fuel predicted to be present at a destination of an aircraft is depicted in accordance with an illustrative embodiment. Turning first to FIG. 4, an illustration of a graphical user interface displaying remaining amounts of fuel predicted for an aircraft is depicted in accordance with an illustrative embodiment. Graphical user interface 400 is an example of one implementation for graphical user interface 300 shown in block form in FIG. 3.

In this depicted example, graphical user interface 400 includes segments 401. Segments 401 include segment 402, segment 404, segment 406, segment 408, segment 410, and segment 412. As depicted, segments 401 all have the same length. Of course, in other illustrative examples, different segments may have different lengths depending on the particular implementation.

Segments 401 represent types of fuel use for an aircraft. For example, segment 402 and segment 404 represent a planned fuel use. Segment 406 represents contingency fuel and segment 408 represents captain's fuel. Segment 410 represents alternate fuel and segment 412 represents reserve fuel.

In this illustrative example, the different types of fuel use may be further emphasized through the use of color. For example, segment 402 and segment 404 for planned fuel use may have color 430. Segment 406 for contingency fuel may have color 432, and segment 408 for captain's fuel use may have color 434. Segment 410 for alternate fuel may have color 436 and segment 412 for reserve fuel may have color 438. In this illustrative example, the amount of fuel for a particular type of fuel use may be illustrated by the amount of fill level of color within a segment.

In these illustrative examples, segments 401 are displayed in the order of use. As a result, fill levels are shown for individual segments in segments 401 and for bar 414 as a whole. For example, bar 414 shows fuel up to fill level 450.

Each of segments 401 provides an indication of the amount of fuel predicted to be present at the destination for a particular type of fuel use. As depicted, the indication is provided through a length of each segment that is relative to the length of other segments in segments 401. The fill level of color in segments 401 provides an indication of the amounts of fuel for each type of fuel use. In these illustrative examples, segments 401 are shown in the form of blocks and have fill levels.

As can be seen in this illustrative example, segments 401 are displayed as bar 414. In other words, the different segments in segments 401 are arranged to form bar 414. As depicted, bar 414 provides an overall indication of the fuel predicted to be present for the aircraft when reaching the destination.

In this illustrative example, text 416 is also displayed in graphical user interface 400. Text 416 is displayed in association with segments 401 in a manner that provides more information about each of segments 401. For example, text 416 is displayed in a manner to indicate the type of fuel use for each segment in segments 401. Additionally, text 416 also identifies the amount of flight time for each type of fuel that is predicted to be present at the destination.

For example, section 418 in text 416 identifies the overall flight time remaining for the aircraft when the aircraft reaches the destination. In other words, section 418 identifies the remaining flight time and the weight of the fuel, taking into account all of the fuel types that are present. In this example, section 418 indicates that a flight time of about two hours and 25 minutes remains when aircraft reaches the destination. The weight of the fuel predicted to be present is about 28,485 pounds.

Section 420 in text 416 is associated with segment 402 and segment 404. Section 420 indicates that an excess amount fuel is predicted to be present at the destination. The excess fuel may result from, for example, tail winds being present.

Next, section 422 in text 416 identifies segment 406 as contingency fuel with 30 minutes of flight time. Section 424 in text 416 identifies segment 408 as captain's fuel with a flight time of about 13 minutes and section 426 in text 416 identifies segment 410 as alternate fuel with a flight time of about 17 minutes. Section 428 in text 416 identifies segment 412 as reserve fuel with a flight time of about 45 minutes.

Next, in FIG. 5, an illustration of a graphical user interface displaying remaining amounts of fuel predicted for an aircraft is depicted in accordance with an illustrative embodiment. In this example, segment 406, segment 408, segment 410, and segment 412 are displayed in graphical user interface 400. Segment 402 and segment 404 are not displayed in this example because all of the planned fuel use is predicted to be used by the time the aircraft reaches the destination.

In this example, section 418 of text 416 indicates that about one hour and 34 minutes of flight time is still available with the fuel predicted to be present at the destination. The weight of the fuel predicted to be present is about 22,840 pounds. As depicted, bar 414 is resized to indicate the change in the fuel predicted to be present. In this illustrative example, a use of contingency fuel may be identified by section 422 in text 416 stating that about 19 minutes of contingency fuel will be present at the destination. The length of segment 406 is shorter than that as displayed in FIG. 4.

With reference next to FIG. 6, another illustration of a graphical user interface displaying remaining amounts of fuel predicted for an aircraft is depicted in accordance with an illustrative embodiment. In this example, section 418 in text 416 indicates that about one hour and 17 minutes of flight time is predicted to be present when the aircraft reaches the destination. The weight of the fuel predicted to be present is about 23,042 pounds. In this example, segment 406 is reduced in length to indicate that a lesser amount of contingency fuel will be present at the destination as compared to the illustration of this segment in FIG. 4 and FIG. 5.

With reference to FIG. 7, yet another illustration of a graphical user interface displaying remaining amounts of fuel predicted for an aircraft is depicted in accordance with an illustrative embodiment. In this example, section 418 of text 416 indicates that about one hour and six minutes flight time will be available when the aircraft reaches the destination. The weight of the fuel predicted to be present is about 22,178 pounds. Further, segment 406 also is not displayed in addition to segment 402 and segment 404 because zero contingency fuel is predicted to be present when the aircraft reaches the destination.

The illustrations of graphical user interface 400 in FIG. 4 are not meant to limit the manner in which other visualizations of predictions of fuel that will be present in the aircraft reaching the destination may be presented to an operator. In other illustrative examples, the weight of the fuel may be omitted from section 418 of text 416. Also, crosshatching or other types of graphical indicators other than color may be used to differentiate segments 401 from each other. For example, text 416 may include font sizes, font types, or other graphical indicators to emphasize the difference between different types of fuel use.

Figure 8:
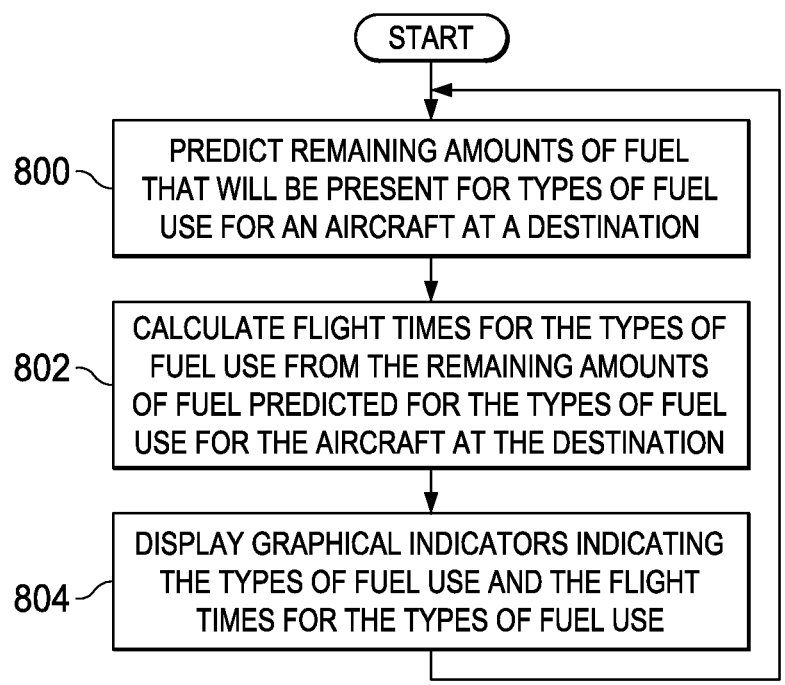
FIG. 8 is an illustration of a flowchart of a process for predicting fuel for an aircraft in accordance with an illustrative embodiment.

With reference now to FIG. 8, an illustration of a flowchart of a process for predicting fuel for an aircraft is depicted in accordance with an illustrative embodiment. The process illustrated in FIG. 8 may be implemented in visual fuel predictor system 110 in FIG. 1.

The process begins by predicting remaining amounts of fuel that will be present for types of fuel use for an aircraft at a destination (operation 800). Thereafter, the process calculates flight times for the types of fuel use from the remaining amounts of fuel predicted for the types of fuel use for the aircraft at the destination (operation 802). The process then displays graphical indicators indicating the types of fuel use and the flight times for the types of fuel use (operation 804).

This process may be repeated any number of times prior to entering flight of aircraft. The visualization displayed by the process may be used by an operator to select and perform an action with respect to the aircraft. This action may be, for example, requesting additional fuel, requesting less fuel, changing the destination, changing an alternate destination, and other suitable actions.

Figure 9:
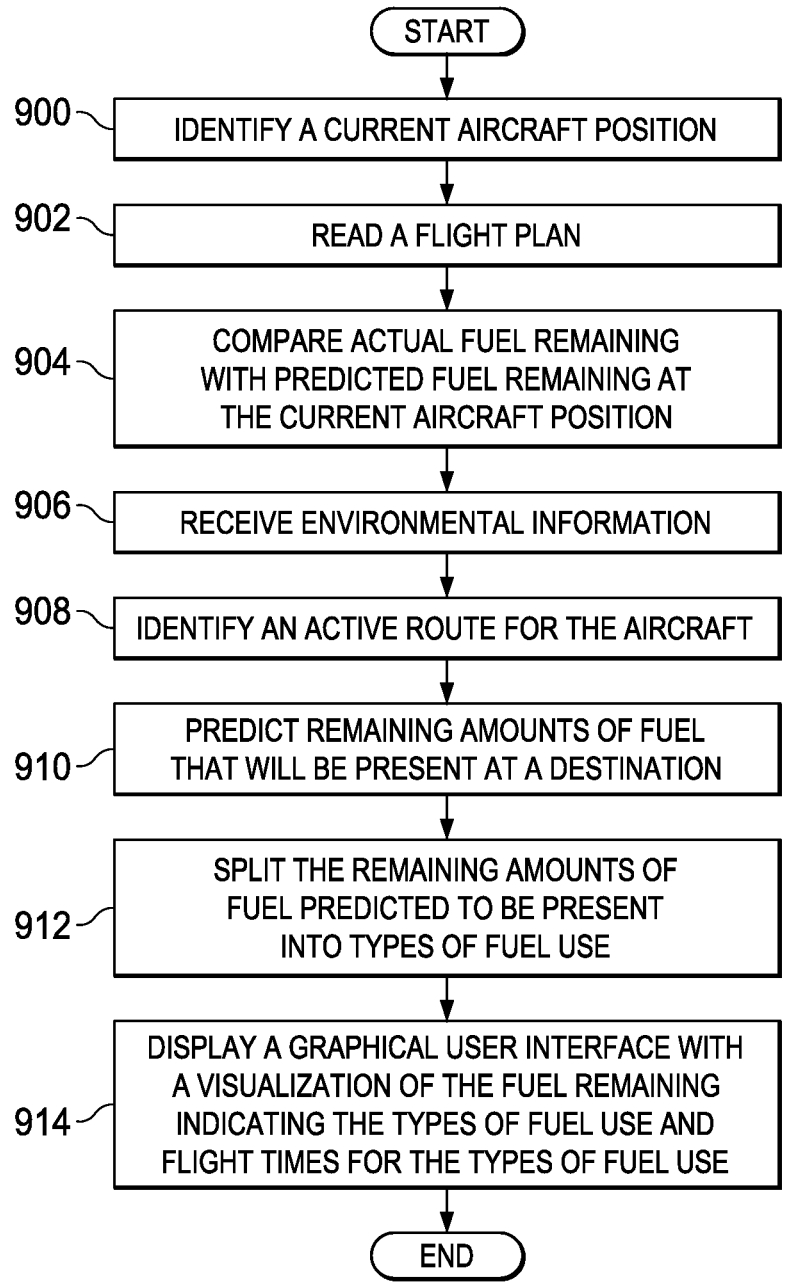
FIG. 9 is an illustration of a flowchart of a process for displaying predictions of fuel for types of fuel use for an aircraft in accordance with an illustrative embodiment.

Turning now to FIG. 9, an illustration of a flowchart of a process for displaying predictions of fuel for types of fuel use for an aircraft is depicted in accordance with an illustrative embodiment. The process begins by identifying a current aircraft position (operation 900). In operation 900, the current aircraft position is identified in relation to the flight plan for this flight of the aircraft. This current position may be the position identified during the generation of the flight plan to predict what fuel will be present for different types of fuel when the aircraft reaches the destination. The current position also may be identified prior to takeoff when the pilot is in the cockpit or during the flight of the aircraft.

Thereafter, the process reads a flight plan (operation 902). In operation 902, the flight plan may be read by retrieving the flight plan from a storage location in a data processing system. In this illustrative example, the flight plan includes information that may be used to predict the fuel remaining in the aircraft when the aircraft reaches the destination. For example, the flight plan includes waypoints, altitudes, wind information, the destination, and other suitable information. Also, the flight plan also may include the types of fuel use planned for the aircraft to be available during the flight.

The process compares actual fuel remaining with predicted fuel remaining at the current aircraft position (operation 904). The process also receives environmental information (operation 906). This environmental information may be, for example, updated information about the wind and the weather. This information may be current information about the wind and the weather for predicted information about these environmental factors.

The process identifies an active route for the aircraft (operation 908). The active route is available as information for the flight management system (FMS) in the aircraft. The active route includes a list of remaining waypoints planned to be reached for the current route being used for the flight of the aircraft. In the illustrative examples, the current position of the aircraft and current route are used to make predictions about the future use of fuel compared to the initial plan.

The current route may have changed compared to the route in the initial flight plan. Thus, the current route is used to predict how much fuel is required from the current position via the next waypoints to the currently planned destination. These waypoints are considered act waypoints and are used to perform calculations for comparison between actual and planned use of fuel.

The process then predicts remaining amounts of fuel that will be present at a destination (operation 910). The prediction of the remaining amounts of fuel at the destination may be made in operation 910 from the actual fuel remaining and any remaining legs in at least one of the route in the flight plan or the active route as well as other factors.

The remaining amounts of fuel predicted to be present are then split into types of fuel use (operation 912). In this illustrative example, the types of fuel use are identified from the flight plan for the aircraft. In this illustrative example, the prediction of fuel remaining may be performed using a process that takes into account this information as well as other information. For example, the prediction of fuel remaining uses a model of the aircraft to identify factors such as the amount of fuel burned based on environmental factors, speed, altitude, and other suitable factors.

The process then displays a graphical user interface with a visualization of the fuel remaining indicating the types of fuel use and flight times for the types of fuel use (operation 914), with the process terminating thereafter. This process may be repeated any number of times to provide information about the fuel predicted to be remaining for the aircraft at the destination.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
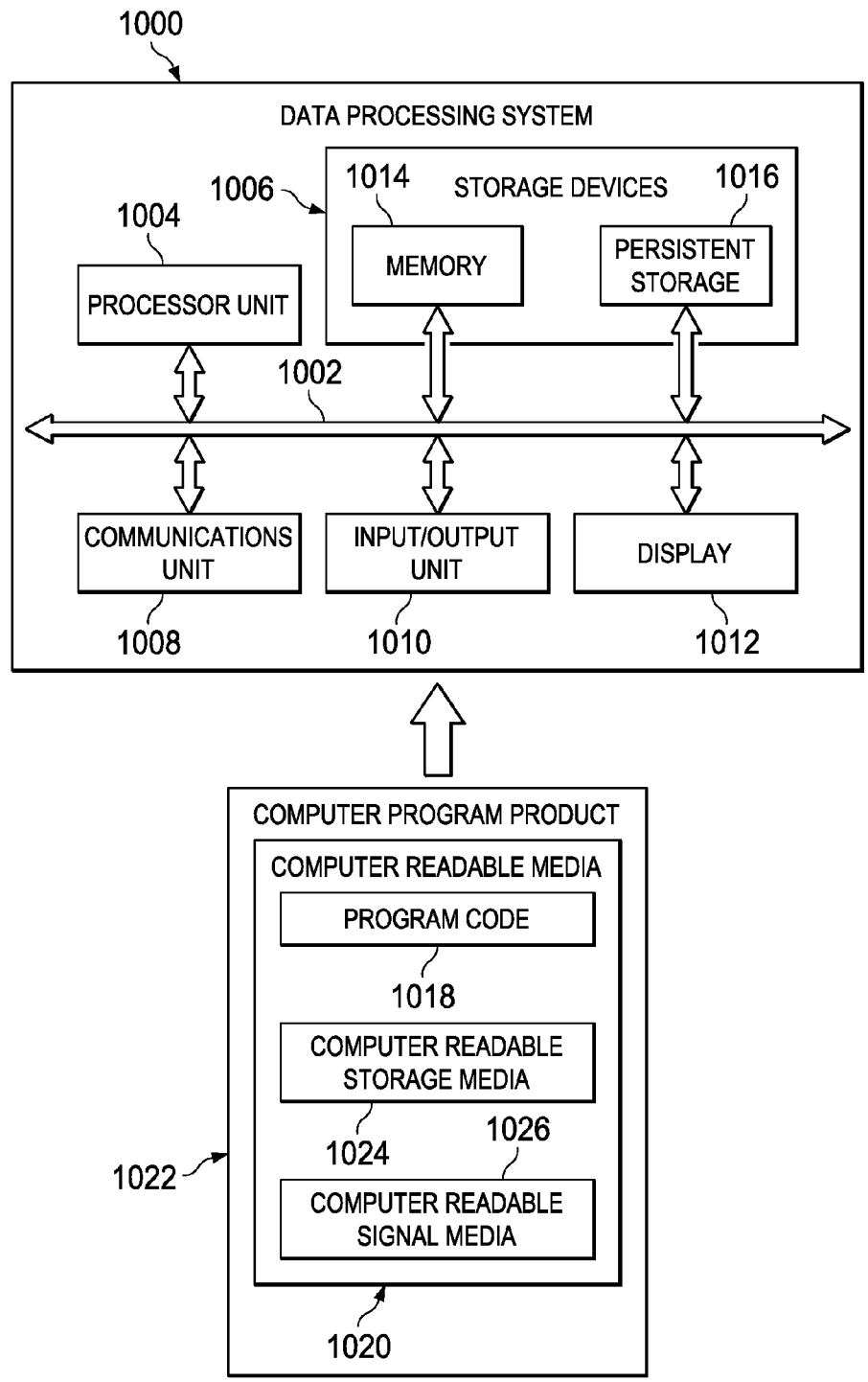
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement one or more data processing systems in computer system 224 in FIG. 2. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise at least one of a number of processors, a multi-processor core, or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications, and/or programs run by processor unit 1004 may be located in storage devices 1006. Storage devices 1006 may be in communication with processor unit 1004 through communications framework 1002. As used herein, a storage device, also referred to as a computer readable storage device, is any piece of hardware capable of storing information on a temporary basis, permanent basis, or both. This information may include, but is not limited to, at least one of data, program code, or other type of information.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems, devices, or both. Communications unit 1008 may provide communications using physical, wireless communications links, or both.

Input/output unit 1010 allows input to be received from and output to be sent to other devices connected to data processing system 1000. For example, input/output unit 1010 may allow user input to be received through a keyboard, a mouse, and/or some other type of input device. As another example, input/output unit 1010 may allow output to be sent to a printer connected to data processing system 1000.

Display 1012 is configured to display information to a user. Display 1012 may comprise, for example, without limitation, at least one of a monitor, a touch screen, a laser display, a holographic display, a virtual display device, or some other type of display device.

In this illustrative example, the processes of the different illustrative embodiments may be performed by processor unit 1004 using computer-implemented instructions. These instructions may be referred to as program code, computer usable program code, or computer readable program code and may be read and executed by one or more processors in processor unit 1004.

In these examples, program code 1018 is located in a functional form on computer readable media 1020, which is selectively removable, and may be loaded onto or transferred to data processing system 1000 for execution by processor unit 1004. Program code 1018 and computer readable media 1020 together form computer program product 1022. In this illustrative example, computer readable media 1020 may be computer readable storage media 1024 or computer readable signal media 1026.

Computer readable storage media 1024 is a physical or tangible storage device used to store program code 1018 rather than a medium that propagates or transmits program code 1018. Computer readable storage media 1024 may be, for example, without limitation, an optical or magnetic disk or a persistent storage device that is connected to data processing system 1000.

Alternatively, program code 1018 may be transferred to data processing system 1000 using computer readable signal media 1026. Computer readable signal media 1026 may be, for example, a propagated data signal containing program code 1018. This data signal may be an electromagnetic signal, an optical signal, and/or some other type of signal that can be transmitted over communications links.

The illustration of data processing system 1000 in FIG. 10 is not meant to provide architectural limitations to the manner in which the illustrative embodiments may be implemented. The different illustrative embodiments may be implemented in a data processing system that includes components in addition to or in place of those illustrated for data processing system 1000. Further, components shown in FIG. 10 may be varied from the illustrative examples shown.

Thus, the illustrative embodiments provide a method and apparatus for predicting the amount of fuel that will be present when an aircraft reaches a destination. In these illustrative examples, prediction of the fuel remaining in an aircraft is displayed as a visualization. This visualization includes a graphical user interface that includes types of fuel use and the flight times for the types of use for fuel predicted to be remaining in the aircraft when the aircraft reaches the destination.

In this manner, an operator, such as a pilot, may more accurately identify fuel needed for a flight of an aircraft as compared to currently used techniques. The illustrative examples may be implemented during planning of a flight, prior to takeoff, and during actual flight of aircraft. In this manner, the situational awareness for a pilot may also be increased to reduce the time and effort needed to make decisions with respect to planning and operating an aircraft. With an illustrative embodiment, confidence in the amount of fuel loaded onto an aircraft may be increased as compared to currently used techniques.

For example, during preflight the pilot may request additional fuel based on the visualization displayed with the types of fuel use and the flight times for the types of use. Additionally, the pilot may also make more accurate decisions as to whether the aircraft should change route to an alternate destination when various environmental conditions change. The environmental conditions include wind, weather, and other suitable conditions. Further, decisions as to changing destinations may be made earlier using a visual fuel predictor system in accordance with an illustrative embodiment.

Also, the pilot may more accurately make decisions about whether to increase the speed of an aircraft to make up for lost time or to continue to fly at the current speed based on the visualization of the predicted fuel remaining in terms of the types of fuel use and the flight times for the types of use.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method for predicting fuel for an aircraft, the method comprising:
using a fuel predictor configured to: predict remaining amounts of fuel that will be present respectively for each type of fuel use among types of fuel use for the aircraft at a destination; calculate a flight time respectively for the each type of fuel use for the types of fuel use from the remaining amounts of fuel predicted for the types of fuel use for the aircraft at the destination; and display graphical indicators on a display system indicating the types of fuel use and the flight times respectively for the each type of fuel use among the types of fuel use.

2. The method of claim 1, wherein displaying the graphical indicators indicating the types of fuel use and the flight times for the types of fuel use comprises:

displaying segments indicating the remaining amounts of fuel predicted for the aircraft, wherein the segments correspond to the types of fuel use and indicate the flight times for the types of fuel use.

3. The method of claim 2, wherein each of the segments has a fill level relative to fill levels for other segments to indicate relative amounts of the fuel remaining for each of the types of fuel use.

4. The method of claim 2, wherein the segments are displayed as a bar.

5. The method of claim 2, wherein displaying the graphical indicators indicating the types of fuel use and the flight times for the types of fuel use further comprises:
displaying text identifying the types of fuel use and the flight times for the types of fuel use.

6. The method of claim 1, wherein predicting the remaining amounts of fuel that will be present for the types of fuel use for the aircraft at the destination comprises:
identifying a position on a route in a flight plan;
identifying actual fuel remaining at the position; and
predicting the remaining amounts of fuel at the destination from the actual fuel remaining and any remaining legs in the route in at least one of the flight plan or an active route.

7. The method of claim 6, wherein predicting the remaining amounts of fuel at the destination from the actual fuel remaining at the position and the any remaining legs in the route in the flight plan comprises:
predicting the remaining amounts of fuel at the destination from the actual fuel remaining and the any remaining legs in the route in the at least one of the flight plan or the active route and taking into account at least one of the actual fuel remaining, a current aircraft position, the flight plan, weather information, or wind data.

8. The method of claim 6, wherein the predicting step is performed prior to a takeoff of the aircraft.

9. The method of claim 6, wherein the predicting step is performed during a flight of the aircraft.

10. The method of claim 1 further comprising:
identifying whether additional fuel is needed based on the graphical indicators displayed that indicate the types of fuel use and the flight times for the types of fuel use.

11. The method of claim 1, wherein the types of fuel use are selected from at least one of: a planned fuel, a reserve fuel, an alternate fuel, captain's fuel, and a contingency fuel.

12. An apparatus comprising:
a display system; and
a fuel predictor configured to predict remaining amounts of fuel that will be present for each type of fuel use among types of fuel use for an aircraft at a destination; calculate a flight time respectively for the each type of fuel use for the types of fuel use from the remaining amounts of fuel predicted for the types of fuel use for the aircraft at the destination; and display graphical indicators that indicate on the display system the types of fuel use and the flight times respectively for the each type of fuel use among the types of fuel use on the display system.

13. The apparatus of claim 12, wherein the fuel predictor is located in one of a flight management system in the aircraft, an electronic flight bag, a tablet computer, a laptop computer, a mobile phone, wearable computer with an optical head-mounted display, and a desktop computer.

14. The apparatus of claim 12, wherein in being configured to display the graphical indicators indicating the types of fuel use and the flight times for the types of fuel use, the fuel predictor is configured to display segments on the display system that indicate a predicted fuel level, wherein the segments correspond to the types of fuel use and the flight times for the types of fuel use.

15. The apparatus of claim 14, wherein each of the segments has a fill level relative to fill levels for other segments to indicate relative amounts of fuel remaining for each of the types of fuel use.

16. The apparatus of claim 14, wherein the segments are displayed as a bar.

17. The apparatus of claim 13, wherein in being configured to display the graphical indicators indicating the types of fuel use and the flight times for the types of fuel use, the fuel predictor is further configured to display text identifying the types of fuel use and the flight times for the types of fuel use.

18. The apparatus of claim 12, wherein in being configured to predict the remaining amounts of fuel that will be present for the types of fuel use for the aircraft at the destination, the fuel predictor is configured to identify a position on a route in a flight plan; identify actual fuel remaining at the position; and predict the remaining amounts of fuel at the destination from the actual fuel remaining and any remaining legs in the route in the flight plan.

19. The apparatus of claim 18, wherein in being configured to predict the remaining amounts of fuel at the destination from the actual fuel remaining and the any remaining legs in the route in the flight plan, the fuel predictor is configured to predict the remaining amounts of fuel at the destination from the actual fuel remaining and the any remaining legs in the route in the flight plan and taking into account at least one of the actual fuel remaining, a current aircraft position, the flight plan, weather information, or wind data.

20. The apparatus of claim 12, wherein the types of fuel use are selected from at least one of: a planned fuel, a reserve fuel, an alternate fuel, captain's fuel, and a contingency fuel.

\* \* \* \* \*